US010814957B2

(12) United States Patent
Zuardy et al.

(10) Patent No.: US 10,814,957 B2
(45) Date of Patent: Oct. 27, 2020

(54) PANEL MEMBER FOR AN AIRFRAME

(71) Applicant: AIRBUS OPERATIONS GMBH, Hamburg (DE)

(72) Inventors: Ichwan Zuardy, Hamburg (DE); Oliver Bullinger, Stade (DE); Claudio Vultaggio, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1100 days.

(21) Appl. No.: 14/304,252

(22) Filed: Jun. 13, 2014

(65) Prior Publication Data
US 2015/0004348 A1 Jan. 1, 2015

(30) Foreign Application Priority Data

Jun. 27, 2013 (EP) .................................... 13174069

(51) Int. Cl.
*B64C 3/20* (2006.01)
*B64C 1/12* (2006.01)
(Continued)

(52) U.S. Cl.
CPC ............... *B64C 3/20* (2013.01); *B32B 38/08* (2013.01); *B32B 38/1808* (2013.01); *B64C 1/00* (2013.01);
(Continued)

(58) Field of Classification Search
CPC combination set(s) only.
See application file for complete search history.

(56) References Cited

U.S. PATENT DOCUMENTS 5,499,782 A * 3/1996 Domine .................... B32B 5/28
244/1 A
5,922,446 A 7/1999 Piening et al.
(Continued)

FOREIGN PATENT DOCUMENTS

DE 197 30 381 8/1998
DE 199 45 557 3/2001
(Continued)

OTHER PUBLICATIONS

Waku, "Carbon-fiber reinforced plastic structure and fuel tank" English translation of JP-2012187808-A from JPlatPat (Year: 2012).*
(Continued)

*Primary Examiner* — Frank J Vineis
*Assistant Examiner* — Laura B Figg
(74) *Attorney, Agent, or Firm* — Jenkins, Wilson, Taylor & Hunt, P.A.

(57) ABSTRACT

The disclosure relates to a composite panel member for an airframe of an aircraft or spacecraft, the composite panel member having a laminated or sandwich structure including: a first outer layer extending over a first side of the panel member; a second outer layer extending over a second side of the panel member; a core layer between the first and second outer layers; and at least one support element configured as an electrical conductor and provided within the core layer between the first and second outer layers. In this regard, the at least one support element extends within the core layer substantially parallel to the first and second outer layers.

19 Claims, 4 Drawing Sheets

(51) Int. Cl.
*B64D 45/02* (2006.01)
*B32B 38/08* (2006.01)
*B32B 38/18* (2006.01)
*B64C 1/00* (2006.01)
*B64G 1/22* (2006.01)

(52) U.S. Cl.
CPC ............... *B64C 1/12* (2013.01); *B64D 45/02* (2013.01); *B64G 1/22* (2013.01); *B32B 2305/08* (2013.01); *B32B 2307/202* (2013.01); *B32B 2398/00* (2013.01); *B32B 2605/18* (2013.01); *B64C 2001/0072* (2013.01); *Y02T 50/43* (2013.01); *Y10T 428/239* (2015.01)

(56) References Cited

U.S. PATENT DOCUMENTS

| 2007/0200266 | A1* | 8/2007 | Elser | C08G 18/58 |
| | | | | 264/54 |
| 2012/0056037 | A1* | 3/2012 | Dolzinski | B64C 1/064 |
| | | | | 244/119 |

FOREIGN PATENT DOCUMENTS

| FR | 2 686 043 | 7/1993 | |
| JP | 2012187808 A | * 10/2012 | ............... B64C 3/34 |
| WO | WO 84/04727 | 12/1984 | |
| WO | WO 90/01857 | 2/1990 | |
| WO | WO 01/21467 | 3/2001 | |
| WO | WO 2010/012900 | 2/2010 | |
| WO | WO 2012/010304 | 1/2012 | |
| WO | WO 2012/028263 | 3/2012 | |

OTHER PUBLICATIONS

Fiala et al. "On the Applicability of Reticulated Foams for the Suppression of Fuel Tank Explosions" pp. 161-173 (Year: 1975).*
European Search report for Application No. 13 17 4069 dated Apr. 2, 2014.
European Office Action for European Application No. 13174069.8 dated May 18, 2017.
European Office Action for European Application No. 13174069.8 dated Jan. 2, 2018.
European Search Report for Application No. 18210733.4 dated Mar. 19, 2019.

* cited by examiner

PANEL MEMBER FOR AN AIRFRAME

CROSS-REFERENCE TO RELATED APPLICATION

This application claims the benefit of and priority to European patent application No. 13 174 069.8 filed Jun. 27, 2013, the entire disclosure of which is herein incorporated by reference.

TECHNICAL FIELD

This invention relates to a panel member for an airframe or fuselage structure, as well as to an airframe or fuselage structure for an aircraft or spacecraft incorporating such a panel member.

The panel member of the invention is especially suitable for use in a fairing, skin or covering of an airframe or fuselage structure, such as in a tail or a vertical stabilizer of an aircraft or spacecraft, and it will be convenient to describe the invention in this exemplary context. However, it will be appreciated that the present invention is not limited to this application, but may be used in a variety of structures, and particularly vehicle structures, such as trains, automobiles, trucks, and ships. Thus, the invention may be suitable for a range of nautical, aeronautical and automotive applications.

BACKGROUND

The use of composite materials in the design of aircraft and spacecraft today is becoming increasingly prevalent due to the light-weight and relatively high-strength properties achievable with those materials, among which fibre-reinforced polymer composites, such as carbon fibre reinforced polymers (CFRP), are especially preferred. The physical properties of composite materials are not always advantageous, however, in particular aeronautical applications. For example, many fibre reinforced composites have a low conductivity and relatively high resistance to both thermal and electrical energy. Thus, when used in an airframe structure at a location susceptible to lightning strikes, such as an upper region of the tail (or vertical stabilizer) or in distal tip regions of the wings, a CRFP composite material, for example, may not dissipate the energy of a lightning strike as effectively as conventional aluminium alloys. One area that has been identified as being of particular interest in development of enhanced structural integrity and lightning strike protection is in the area of composite panels, and especially panels having a laminated or composite sandwich structure, which are designed for use in a fairing, skin or covering of an airframe or fuselage.

SUMMARY

A new and improved panel member is disclosed herein that address one or more of the issues identified above. In particular, it would be useful to provide a new panel member, especially for an airframe or fuselage structure, which is designed for enhanced protection in the event of a lightning strike.

According to one aspect, therefore, the disclosure provides a composite panel member for an airframe of an aircraft or a spacecraft. The panel member has a laminated or sandwich structure comprising: a first outer layer which extends over a first side of the panel member, a second outer layer which extends over a second side of the panel member, and a core layer between the first and second outer layers. At least one support element is provided in the core layer and extends within the core layer substantially parallel to the first and second outer layers and is configured as an electrical conductor. Preferably, the at least one support element also at least partially spans or extends over a width of the core layer between the first and second outer layers.

In this regard, the at least one support element in the core layer is designed to "support" or protect the laminated or sandwich structure of the panel member by conducting and distributing electrical energy away from a lightning strike, e.g. occurring at an external side of the panel member, through the core layer and over an area of the panel. Such a distribution of the electrical energy thus dissipates the intensity of the strike at the point of impact and so protects the laminated or sandwich structure of the panel at that location. Further, in one embodiment, the at least one support element provided in the core may be designed to provide structural "support" or reinforcement to the laminated or sandwich structure of the panel member. In this way, the at least one support element can also be designed to protect or reinforce the panel structure panel, which may also be advantageous in the event of a lightning strike. Thus, it will be appreciated that the term "support" in respect of the feature of the "at least one support element" may be understood in the context of protection (i.e. physical protection) and/or structural reinforcement. In this way, the at least one "support element" referenced herein may also be considered to be a "protector element" or an "energy distributor element", and/or a "reinforcement element".

Regarding the first and second "outer" layers of the sandwich structure, it will be appreciated that these layers need not necessarily form or constitute outermost layers of the panel member, but that the term "outer" in this sense rather refers to the position of these first and second layers on opposite outer sides of the core layer of the laminated or sandwich structure. Thus, additional outer layers may also be provided on the first and/or second layers.

In a further embodiment, the at least one support element spans a full width of the core layer from the first outer layer to the second outer layer. In other words, considered in a plane of a cross-section taken through the laminated or sandwich structure from the first side to the second side of the panel member, the at least one support element for example spanning the full width of the core layer. As a consequence, the at least one support element may be electrically conductive across the full width of the core layer between the first and second outer layers and/or across the full cross-sectional width of the panel member. That is, the at least one support element may be configured to conduct electrically between the first side and the second side of the panel member. To this end, each support element may include or be comprised of a metal, such as copper or aluminium. In particular, the at least one support element may be comprised of a metallic mesh or screen, or may include a metallic foil.

In another embodiment, the at least one support element is elongate and extends substantially continuously within the core in a direction substantially parallel to the first and second outer layers, optionally across a full expanse of the panel member. The at least one support element may also span the full (cross-sectional) width of the core layer over its entire length or longitudinal extent. As a result, the at least one support element may form or create a barrier across the width of the core layer to the propagation of any cracks which may arise in this part of the laminated or sandwich structure of the composite panel member. It will be appreciated that the cross-sectional width of the core layer and/or of the panel member itself may vary over an extent or expanse of the panel member (i.e. over an extent or expanse of the first side or the second side). Accordingly, a size or dimension of the at least one support element in its cross-sectional profile may also vary over its length. In this context, in a specific embodiment, the at least one support element has a cross-section or profile transverse to its longitudinal axis that is I-shaped, T-shaped, L-shaped or Z-shaped. Thus, each support element may be configured to act as, or form, a structural reinforcement in the panel member.

In a further embodiment of the invention, the panel member includes a plurality of the support elements within the core layer. The plurality of support elements are typically spaced apart from one another at regular intervals and may be arranged to extend substantially parallel to one another. In this way, the support elements may extend over a large area of the panel member. In one specific embodiment, each of the plurality of support elements may be electrically connected with one another. The electrical energy transmitted to one support element may then be conducted to other support elements in the panel member. For example, the plurality of support elements may be arranged in parallel with one another running in two directions, and optionally connected with one another at points of intersection, thereby forming a grid of support elements extending within the core layer. In this way, the support elements may cover substantially an entire area of the panel member.

As noted at the outset, the present disclosure is especially concerned with a panel member having a laminated or sandwich structure comprising composite materials. In a further embodiment therefore, each of the first and second outer layers is comprised of a composite material, for example a fibre-reinforced polymer material like a glass fibre reinforced polymer (GFRP) or carbon fibre-reinforced polymer (CFRP). In this connection, the fibres may be selected from the group consisting of glass, carbon, and aramid fibres. The polymer matrix material may be selected from the group consisting of epoxy, polyester, vinyl ester and nylon resins. Furthermore, the core layer may be a relatively low density material, such as a foam (e.g. a solid foam or a hard foam, which may have an open-cell or closed-cell structure), and may be comprised of a synthetic material, such as a polymer. Synthetic foams, like polyvinyl-chloride, polyurethane, polyethylene or polystyrene foams, as well as syntactic foams or metallic foams may be contemplated as a material of the core layer. In this regard, a sandwich-structured composite is typically fabricated with the first and second outer layers forming two thin but stiff skins to a lightweight but relatively thick core. The core material is typically a lower strength material than the outer layers, but its higher thickness provides the sandwich structure with a relatively high bending stiffness and yet with an overall relatively low density.

In another embodiment, the at least one support element is fully embedded within the core layer of the laminated or sandwich structure. In this way, each support element may be in contact with and/or connected to either or both of the first and second outer layers. In one particular embodiment or configuration, the at least one support element may be in contact with and/or connected to the first outer layer, span a full width of the core layer and also project through the second outer layer to or beyond the second side of the panel member. Optionally, either or both of the first and second outer layers of the laminated or sandwich structure include an electrically conductive sheet or foil, which may be substantially coextensive therewith. In this way, each said at least one support element may be in electrical conducting contact with such a sheet or foil in either or both of the first and second layers of the panel member.

In a further embodiment, the at least one support element is provided with a covering or a coating, which may enhance its bonding to and/or integration in the core layer of the panel member. For example, the at least one support element may include a polymer covering or coating, or an FRP covering or coating for improved bonding or adhesion within the core of the laminated or sandwich structure. Where each said at least one support element is comprised a metal, e.g. of a copper mesh, the support element may optionally be covered or coated with a laminate, e.g. a prepreg. This coating or covering may thus not only enhance the bonding to any one of the core and/or the outer layers of the panel, but may also enhance or improve the structural properties of the support element. That is, a relatively soft and ductile copper mesh may be stiffened via a prepreg or FRP coating or covering to better reinforce the panel member.

In a further embodiment, the panel member may include an electrically conducting additive, e.g. to the core layer and/or to either or both of the first and second layers, to enhance electrical conductivity through the panel member. For example, the conducting additive may include metallic particles or metallic powder, such as copper powder, which may be added to the panel member adjacent each support member.

Expressed in another manner, a broad aspect of the disclosure provides a composite panel for an airframe of an aircraft or spacecraft. The composite panel has a sandwich or laminated structure comprising a first layer, a second layer, and a core between the first and second layers. At least one support element or protector element is provided or arranged within the core such that it extends within the core substantially parallel to the first and second layers and is configured for electrical conduction through the core.

According to a further aspect, the present disclosure provides a method of producing a composite panel member for a vehicle body structure, such as an airframe or fuselage structure for an aircraft or spacecraft, the method comprising:

providing a core layer, for example of a solid or hard foam, for a composite sandwich structure;

providing at least one elongate support element in the core layer, the at least one support element being configured as an electrical conductor;

arranging the core layer between first and second fibre reinforcement sheet layers in a sandwich arrangement, such that the at least one support element extends within the core layer substantially parallel to the first and second sheet layers; and impregnating the sandwich arrangement, and particularly the first and second fibre reinforcement sheet layers, with a polymer resin.

In a further embodiment, providing at least one elongate support element in the core layer includes forming at least one recess in the core layer (e.g. in the solid or hard foam) for receiving a respective support element, and then inserting or embedding the respective support element in that recess. The at least one recess is desirably formed with a geometry corresponding to a shape of the support element. The step of impregnating the sandwich arrangement preferably includes resin infusion, e.g. via a vacuum bagging or a resin transfer moulding (RTM) technique, such as vacuum-assisted resin transfer moulding (VARTM). The method will typically also include the step of curing the polymer resin after the impregnating step. In this regard, care needs to be taken in the impregnating and curing steps to avoid residual stresses forming in the composite sandwich structure. The materials of both the support elements and the core may play a significant role here. For example, whereas a hard foam core will tend to contract upon cooling after curing, a prepreg or FRP coating or covering over the support elements typically has a lower coefficient of thermal expansion and will largely unaffected by the cooling, which can lead to residual stresses. A copper support element under the prepreg or FRP coating or covering, on the other hand, will have a relatively high coefficient of thermal expansion, which in turn may counteract the tendency of the prepreg or FRP coating or covering not to deform much under the temperature differential upon cooling, especially where the coating or covering is quite thin.

According to a further aspect, the present disclosure provides a vehicle body structure, especially an airframe, fuselage or box structure for an aircraft or spacecraft, comprising:

a composite panel with a laminated or sandwich structure comprising: a first layer which extends over a first side of the panel member, a second layer which extends over a second side of the panel member, a core layer between the first and second layers, and at least one support element provided in the core layer and extending generally parallel to the first and second layers; and an elongate structural member attached to the panel member at the second side thereof, the elongate structural member being substantially aligned with and/or connected with the at least one support element;

wherein the at least one support element is configured as or forms an electrical conductor between the first side of the panel member and the elongate structural element at the second side of the panel member.

In another embodiment, the elongate structural member is connected with the at least one support element at the second side of the panel member, for example at an interface that is substantially parallel to the second layer. In this regard, the elongate structural member may have a cross-section or profile transverse to its longitudinal axis that is I-shaped, T-shaped, L-shaped or Z-shaped, such that a flange of its profile is arranged parallel to the second layer at the second side of the panel. In a modified embodiment, however, the elongate structural member may be connected with the support element at an interface that is substantially perpendicular to the second outer layer. In this modified embodiment, for example, the at least one support element may project through or beyond the second outer layer to the second side of the panel member for connection to a web in the profile of the elongate structural member.

In a further embodiment, the at least one support element is elongate and extends substantially continuously within the core in the direction substantially parallel to the first and second outer layers. Furthermore, considered in a transverse cross-section, the at least one support element spans a width of the core between the first and second layers such that it may form a barrier to crack propagation in the core.

As already discussed in detail, the panel member may include a plurality of the said at least one support element within the core. The plurality of support elements may be spaced apart from one another at intervals and are desirably arranged to extend substantially parallel to one another. The plurality of support elements may also be connected with one another electrically.

Further, as also noted above, the panel member may be comprised of composite materials. In a further embodiment, therefore, each of the first and second layers is comprised of a composite material, such as a fibre-reinforced composite, like GFRP or CFRP. The core may be formed of a relatively low density material, such as a solid foam or hard foam, and is preferably comprised of a polymer material. The structural member, also, may be comprised of a composite material, such as a fibre-reinforced polymer (FRP) material, though the structural member could also be comprised of a metal or metal alloy, such as an aluminium or titanium alloy.

According to a further aspect, the present disclosure provides a vehicle, such as an aircraft or spacecraft, having a body structure (e.g. an airframe or fuselage structure) according to any one of the embodiments described above.

BRIEF DESCRIPTION OF THE DRAWINGS

For a more complete understanding of the present invention and the advantages thereof, exemplary embodiments of the invention are explained in more detail in the following description with reference to the accompanying drawings, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

DETAILED DESCRIPTION

Figure 1:
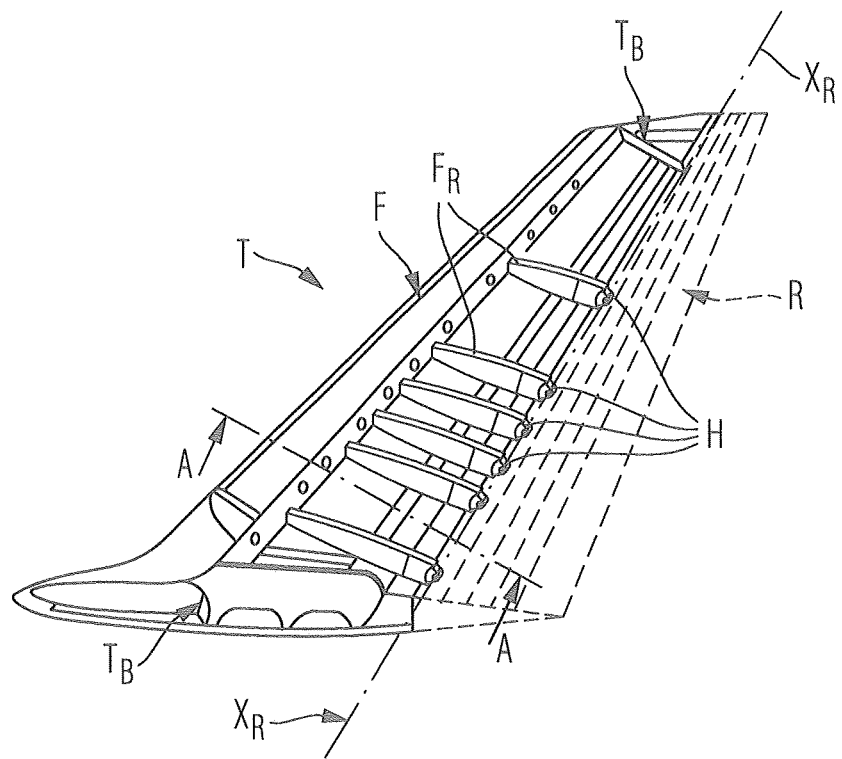
FIG. 1 is a schematic view of the structure of a tail or vertical stabilizer of an aircraft.
Figure 2:
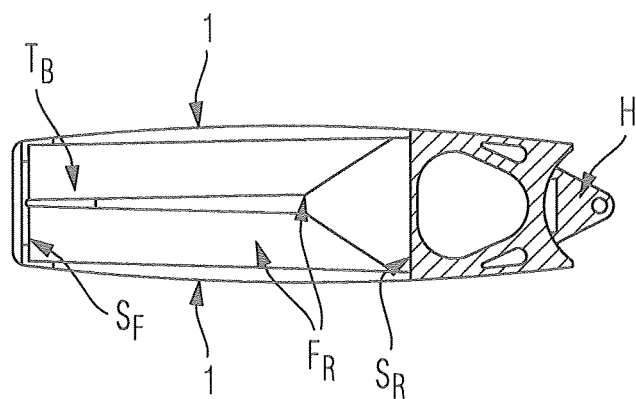
FIG. 2 is a cross-sectional view of the tail or vertical stabilizer of FIG. 1 in a direction of arrows A-A.

With reference firstly to FIGS. 1 to 4 of the drawings, parts of an airframe of an aircraft are illustrated. FIG. 1, for example, shows the typical structure of a tail T or vertical stabilizer of an aircraft in a schematic perspective view. In this regard, the tail T includes a central box structure $T_B$, which is shown in cross-section in FIG. 2. A forward side of this central box structure $T_B$ is provided with an aerodynamic fairing F to form a leading edge of the vertical stabilizer T and a series of hinge arms H are provided along a trailing side of the box structure $T_B$ for the attachment of a rudder component R, which is then pivotable about the pivot axis $X_R$ for controlling aircraft direction in flight. With reference to FIG. 2, the box structure $T_B$ of the tail includes a front spar $S_F$, frame ribs $F_R$, a rear spar $S_R$ to which the rudder hinge arms H are mounted, and outer panel members 1, which form a skin K or fairing over the box structure $T_B$.

Figure 3:
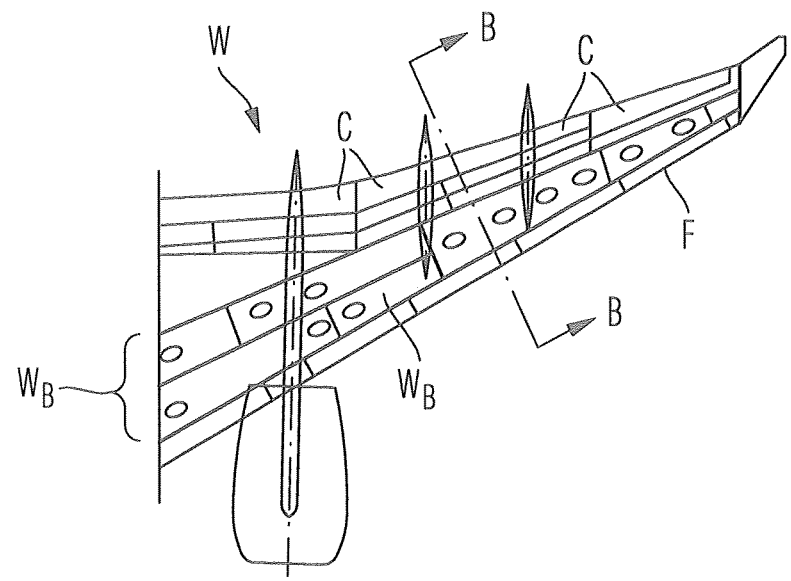
FIG. 3 is a schematic view of the structure of a wing of an aircraft.
Figure 4:
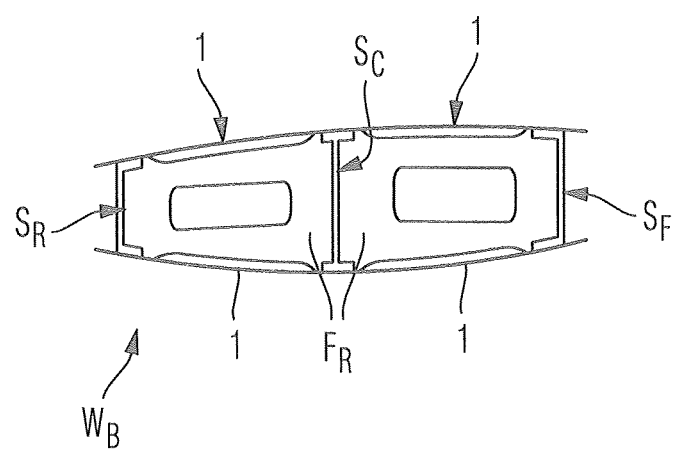
FIG. 4 is a cross-sectional view of the wing of FIG. 3 in the direction of arrows B-B.

Similarly, FIG. 3 shows a wing W, a part of which is shown in cross-section in drawing FIG. 4 in a direction of arrows B-B. Again, the wing W has a central box structure $W_B$ having front and rear spars $S_F$, $S_R$ for respectively supporting a leading edge fairing F and trailing edge control surfaces C, such as flaps and ailerons. Again, panel members 1 are provided on upper and lower sides of the box structure $W_B$ of the wing W, also supported by central spars $S_C$ of the box structure $W_B$ to form a skin K (e.g. aerodynamic skin) of the wing structure. It will be appreciated from FIG. 2 and FIG. 4 that the panel members 1 mounted on the box structures $T_B$, $W_B$ of the tail T and the wing W, respectively, have a lenticular form (i.e. a lens shape) in cross-section. The benefits of this lenticular panel form are described, for example, in the International patent application no. WO 2012/028263 A1.

The design or configuration of the panel members 1 according to embodiments of the invention will now be further described with reference to FIGS. 5 and 6 of the drawings, as well as their incorporation in an airframe of an aircraft, such as in the wing structure W and/or the tail or vertical stabilizer structure T of FIGS. 1 to 4.

Figure 5:
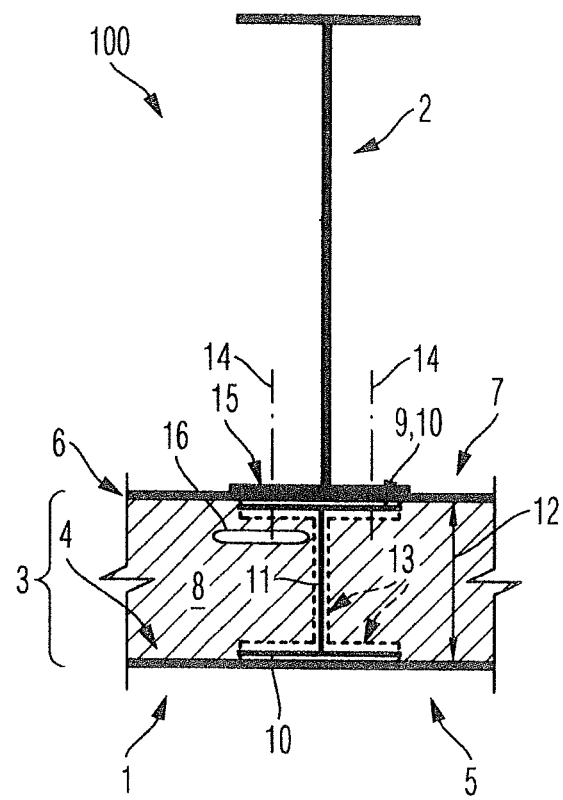
FIG. 5 is a cross-sectional view of a panel member of one embodiment incorporated in an airframe structure.

Referring now to FIG. 5, therefore, an airframe structure 100 according to an embodiment is illustrated which may be directly applicable to the vertical stabilizer T or wing structure W shown in FIGS. 1 to 4. The airframe 100 comprises a composite panel member 1, which may form a fairing F or a skin K of the airframe, and an elongate structural member 2 attached at one side (i.e. at an internal side) of the panel member 1. The panel member 1 has a sandwich structure 3 comprising a first outer layer 4 on a first side 5 (i.e. on an external or aerodynamic side) of the panel 1, and a second outer layer 6 on a second side 7 (i.e. the internal side) of the panel member 1. Further, a core 8 is arranged as a layer between, and coextensive with, the first and second layers 4, 6. As is typical in composite sandwich structures, the first and second outer layers 4, 6 of the sandwich are relatively thin, while the core 8 is relatively thick.

With reference to FIG. 5, the panel member 1 further includes a plurality of support elements 9, of which only a single one is illustrated here in cross-section. The support elements 9 are elongate and are arranged generally parallel and spaced apart from one another at regular intervals across a breadth of the panel member 1, only a portion of which is shown in FIG. 5. These support elements 9 extend transversely across the panel member 1 within the core 8 generally parallel to the internal and external outer layers 4, 6. As can be seen, each support element 9 has a cross-sectional profile that is I-shaped and thus forms a transverse stiffener. Furthermore, each support element 9 is comprised of a copper mesh in its I-shaped cross-sectional profile. The first outer layer 4 at the external side of the panel member 1 is comprised of a composite material, such as carbon fibre-reinforced polymer (CFRP), but preferably includes an electrically conducting metal foil on or over an outer surface of that layer 4. In a similar manner, the second outer layer 6 at the internal side of the panel 1 is comprised of a composite material, such as carbon fibre-reinforced polymer (CFRP). This second layer 6, however, will typically not include a conducting foil.

As is apparent from FIG. 5 of the drawings, the generally I-shaped support element 9 has flanges 10 at opposite sides of a central web 11. To the external side 5 of the panel member, these flanges 10 are in intimate contact with the first CFRP layer 4. To the opposite, internal side 7 of the panel 1, the flanges 10 of each support element 9 are in intimate contact with the second CFRP layer 6 of the panel. In this way, each of the support elements 9 in the core 8 spans a full width 12 of the core 8 from the first layer 4 at the external side 5 of the panel member 1 to the second layer 6 at the internal side 7 of the panel. Each support element 9 thereby forms an electrical conductor extending both transversely through the panel 1 as well as across a full width 12 of the panel.

In order to enhance adhesion or bonding between the solid or hard foam material of the core layer 8 and the copper mesh of each support element 9, the support elements 9 are provided with a coating or covering 13 of fibre-reinforced polymer FRP materials, such CFRP. This coating 13 may, for example, be in the form of a CFRP prepreg applied to the support element 9 before it is inserted or embedded into the foam core 8. In this regard, such prepreg sheets will typically have a sticky or tacky consistency which enable them to readily adhere and bond both to the copper mesh support element 9 as well as to the foam material of the core 8 when the support element 9 is inserted or embedded in that core layer. Alternatively, dry fibre material may be used, e.g. as a woven fabric or a non-woven fabric. In that case, a binder material will typically also be used to ensure a good adherence to both the copper mesh of the support element 9 and the solid foam material of the core 8. The binder will typically be activated by heating or curing to effect the adherence or bonding. Once cured, the coating or covering 13 will also render the support element 9 stiffer or more rigid to structurally reinforce the panel 1.

The structural member 2 (e.g. such as a frame rib FR) of the airframe 100 is attached to the panel member 1 in substantial alignment with the support element 9. This attachment may be, for example, by traditional fastening elements 14, such as rivets or bolts (e.g. Hi-Lok). The structural member 2 in this embodiment also has an I-shaped cross-sectional profile, with flanges 15 being essentially aligned with the flanges 10 of the support element 9 at the internal side 7 of the panel member 1. Flanges 15 are connected to each other by a web 18 to define the I-shaped cross-sectional profile. To enhance the electrical conductivity between the copper mesh flanges 10 of each support element 9 and the respective first and second outer layers 4, 6 of the sandwich structure 3 on opposite sides of the core 8, a metallic powder (not shown) such as copper powder may be added over the area at which the flanges 10 of the support elements 9 abut and/or contact the respective first and second layers 4, 6.

In this embodiment, therefore, the composite panel member 1 integrated within the airframe 100 as seen in FIG. 5 provides for dramatically enhanced safety and structural integrity in the skin K of an aircraft in the event of a lightning strike. In particular, the panel member 1 of the invention is able to conduct and effectively distribute the electrical discharge from a lightning strike rapidly throughout the panel so that the energy of the lightning strike is not concentrated or focused solely in the vicinity of the strike itself. That is, the metal foil in the first outer layer 4 distributes energy of the lightning to the support elements 9 extending through-out the panel 1. By distributing the electrical energy over a large area, damage to the panel and/or the airframe structure as a whole can be substantially avoided.

A significant further advantage of the configuration of this panel member 1 is that formation of a crack 16 in the core 8 can be significantly inhibited. That is, even if a crack 16 were to form in the solid foam of the core layer 8 (e.g. due to a lightning strike), the fact that the support elements 9 span a full width 12 of the core layer 8 between the first and second layers 4, 6 of the panel 1 and extend continuously in a transverse direction across the core 8 results in those mesh support elements 9 effectively forming barriers through the panel 1 which prevent propagation of that crack 16.

Figure 6:
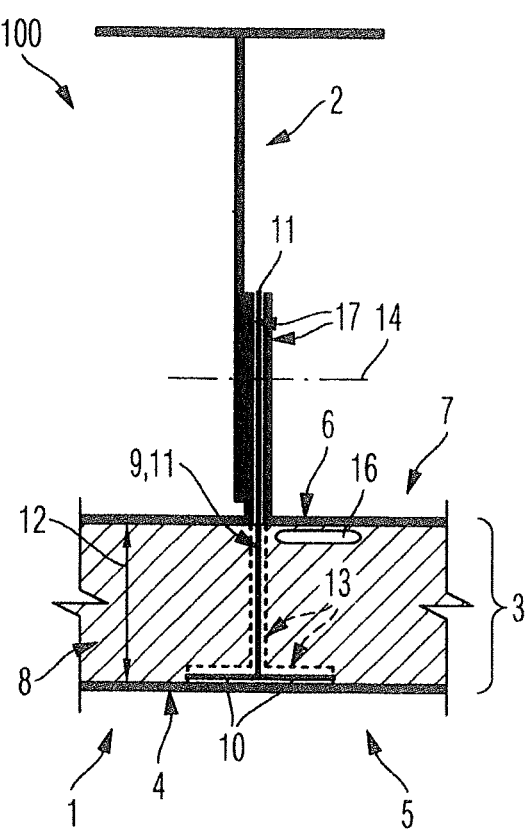
FIG. 6 is a cross-section view of a panel member according to another embodiment shown incorporated in an airframe structure.

Referring now to FIG. 6 of the drawings, another embodiment of an airframe structure 100 of the invention is shown in cross-sectional view. The general principles of the arrangement and configuration of the parts of panel member 1 in FIG. 6 are substantially the same as for FIG. 5, such that the same reference numerals identify corresponding or like parts, the description of which will be omitted in the same level of detail to avoid repetition.

A clear difference in this embodiment, however, is that the support elements 9, which are again elongate and extend in a generally transverse direction within the foam core 8 in the sandwich structure 3 of the panel 1, have an inverted T-shape in cross-sectional profile. The flanges 10 of the profile of the support elements 9 are again in contact with the first CFRP layer 4 at the first or external side 5 of the panel member. The web 11 of that profile, however, projects through a plane of the second outer layer 6 at the internal side 7 of the panel member 1. Thus, portions 17 of the second layer 6 may be extended through a 90 degree bend to sheath or cover the projecting web 11 of each copper mesh support element 9 at that internal side 7 of the panel. Within the foam core 8, the T-shaped copper mesh support elements 9 are again covered or coated with CFRP material 13 to enhance the bonding to the foam material of the core 8. In this case, the structural member 2 also has a T-shaped cross-sectional profile and is secured to the panel member via fastening elements 16 such as rivets or bolts at an interface formed by the overlap with a web of the respective T-shaped profiles.

Figure 7:
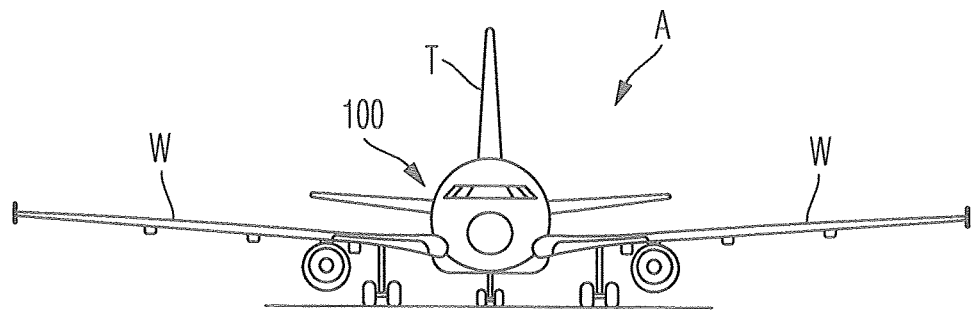
FIG. 7 is a schematic illustration of an aircraft in which one or more panel member according to an embodiment is installed.

With reference to FIG. 7, a schematic illustration is shown of an aircraft A having an airframe 100, including the tail T and the wings W as well as the fuselage, in which one or more panel members 1 according to an embodiment, for example, as described with reference to FIG. 5 or FIG. 6, is incorporated.

Figure 8:
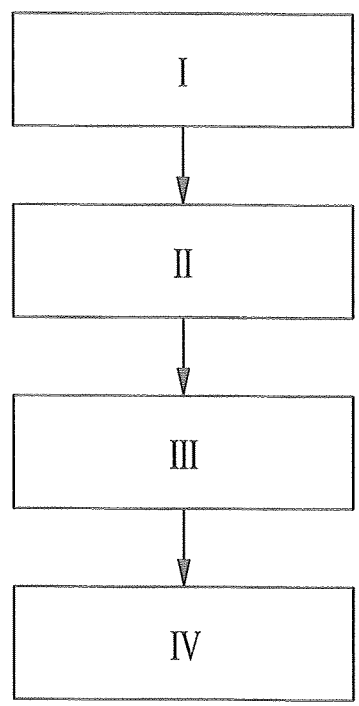
FIG. 8 is a flow diagram which schematically illustrates a method according to an embodiment.

Referring now to FIG. 8 of the drawings, a flow diagram is shown that schematically illustrates the steps in a method of forming a panel member 1 according to the embodiments of the invention described above with respect to FIGS. 5 and 6. In this regard, the first box I of FIG. 8 represents the step of providing a core layer 8, e.g. of a solid or hard foam, for a composite sandwich structure 3. The second box II represents the step of providing at least one elongate support element 9 configured as an electrical conductor in the core layer 8. This will typically include forming at least one recess in the foam core 8 for receiving a respective support element 9, and then inserting or embedding the respective support element 9 in that recess. The third box III represents the step of arranging the core layer 8 between first and second fibre reinforcement sheet layers in a sandwich arrangement 3, such that the at least one support element 9 extends within the core layer 8 substantially parallel to these first and second sheet layers 4, 6. The fourth box IV in FIG. 8 then represents the step of impregnating the sandwich arrangement 3, and especially the first and second fibre reinforcement sheet layers, with a polymer resin. The step of impregnating the sandwich arrangement 3 may comprise resin infusion, e.g. via a vacuum bagging or a resin transfer moulding (RTM) technique. After the impregnating step, the method typically also includes a step of curing the polymer resin, e.g. by heating the impregnated the sandwich arrangement 3 over a period of time, taking care to avoid residual stresses being generated or occurring in the composite sandwich structure.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

What is claimed is:

1. A composite panel member for forming an outer skin around an internal structure of an airframe of an aircraft or spacecraft, the composite panel member comprising:
   a first layer extending over a first side of the panel member, the first side of the panel member being an external surface of the outer skin, wherein the first side faces away from and is separated from the internal structure;
   a second layer extending over a second side of the panel member, the second side of the panel member being an internal surface of the outer skin, wherein the second side faces towards and contacts the internal structure;
   a core layer between the first and second layers, the core layer being external to the internal structure and separated from the internal structure by at least the second layer; and
   at least one support element, which is an electrically conductive material and extends within the core layer to electrically connect the first layer to the second layer through a full width of the core layer;

wherein the at least one support element has a longitudinal axis that extends in a direction substantially parallel to the first and second layers;

wherein the panel member is configured to be attached, at the second side thereof, to an elongate structural member of the internal structure that is external to the panel member and extends away from the second layer of the panel member;

wherein the first layer, the second layer, and the core layer are arranged such that the panel member has a laminated, or sandwich, structure; and wherein the first layer or the second layer include an electrically conductive sheet or foil, which is substantially coextensive with the first layer or the second layer.

2. The panel member according to claim 1, wherein the at least one support element is elongate and extends substantially continuously within the core layer in the direction substantially parallel to the first and second layers.

3. The panel member according to claim 1, wherein, in a plane of a cross-section taken through the laminated or sandwich structure from the first side to the second side of the panel member, the at least one support element spans the full width of the core layer, from the first layer to the second layer, to form a barrier through the core layer.

4. The panel member according to claim 1, wherein the at least one support element comprises a metallic mesh or a metallic foil.

5. The panel member according to claim 1, wherein the at least one support element includes a covering or a coating, the covering or coating comprising a prepreg.

6. The panel member according to claim 1, wherein each of the first and second layers comprises a composite material, and wherein the core layer comprises a material having a lower density than the composite material of the first and second layers.

7. The panel member according to claim 6, wherein the composite material of the first and second layers comprises a fibre-reinforced polymer composite, and wherein the core layer comprises a hard foam having an open-cell or closed-cell structure.

8. The panel member according to claim 1, wherein a first portion of the at least one support element is fully embedded within the core layer of the laminated or sandwich structure, the first portion of the at least one support element being in contact with and/or connected to either of the first and second layers, and wherein a second portion of the at least one support element projects through the second layer to the second side of the panel member.

9. The panel member according to claim 1, wherein the at least one support element has a cross-section or profile transverse to the longitudinal axis thereof that is I-shaped, T-shaped, L-shaped, or Z-shaped.

10. The panel member according to claim 1, wherein both the first layer and the second layer include the electrically conductive sheet or foil which is substantially coextensive therewith.

11. An aircraft or spacecraft having a panel member according to claim 1.

12. A vehicle body structure, the body structure comprising:

a composite panel member for forming an outer skin around an internal structure of the vehicle body structure, the panel member comprising:

a first layer over a first side of the panel member, the first side of the panel member being an external surface of the outer skin, wherein the first side faces away from and is separated from the internal structure;

a second layer over a second side of the panel member, the second side of the panel member being an internal surface of the outer skin, wherein the second side faces towards and contacts the internal structure;

a core layer between the first and second layers, the core layer being external to the internal structure and separated from the internal structure by at least the second layer; and at least one support element, which is an electrically conductive material and extends within the core layer to electrically connect the first layer to the second layer through a full width of the core layer, wherein the at least one support element has a longitudinal axis that extends in a direction generally parallel to the first and second layers; and wherein the first layer, the second layer, and the core layer are arranged such that the panel member has a laminated, or sandwich, structure; and wherein the first layer or the second layer include an electrically conductive sheet or foil, which is substantially coextensive with the first layer or the second layer; and an elongate structural member attached to the panel member at the second side of the panel member, the elongate structural member being substantially aligned and/or connected with the at least one support element; wherein the elongate structural member is external to the panel member and extends away from the second layer of the panel member.

13. The vehicle body structure according to claim 12, wherein the elongate structural member is connected to the at least one support element at the second side of the panel member, and wherein the elongate structural member has a cross-section or profile transverse to the longitudinal axis thereof that is I-shaped, T-shaped, L-shaped, or Z-shaped.

14. The vehicle body structure according to claim 12, wherein the elongate structural member is connected to the at least one support element at an interface that is substantially perpendicular to the second layer.

15. The vehicle body structure according to claim 12, wherein the at least one support element is elongate and extends substantially continuously within the core layer in the direction substantially parallel to the first and second layers, and wherein the at least one support element spans the full width of the core layer, from the first layer to the second layer, such that a barrier is formed in the core layer.

16. The vehicle body structure according to claim 12, wherein each of the first and second layers comprises a composite material, and wherein the core layer comprises a material having a lower density than the composite material of the first and second layers.

17. The vehicle body structure according to claim 16, wherein the composite material of the first and second layers comprises a fibre-reinforced polymer composite, and wherein the core layer comprises a hard foam having an open-cell or closed-cell structure.

18. An aircraft or spacecraft having a vehicle body structure according to claim 12.

19. A method of producing a composite panel member for forming an outer skin around an internal structure of a vehicle body structure, the method comprising:

providing a first layer extending over a first side of the panel member, the first side of the panel member being an external surface of the outer skin, wherein the first side faces away from and is separated from the internal structure;

providing a second layer extending over a second side of the panel member, the second side of the panel member being an internal surface of the outer skin, wherein the second side faces towards and contacts the internal structure;

providing an electrically conductive sheet or foil on and/or in the first layer or the second layer, the sheet or foil being substantially coextensive with the first layer or the second layer;

arranging a core layer for a composite sandwich structure between the first and second layers in a sandwich arrangement, the core layer being external to the internal structure and separated from the internal structure by at least the second layer;

providing at least one support element that extends within the core layer in a direction substantially parallel to the first and second layers, wherein the at least one support element is an electrically conductive material; and electrically connecting, via the at least one support element, the first layer to the second layer through the core layer;

wherein the panel member is attachable to an elongate structural member of the internal structure at the second side of the panel member, the elongate structural member being external to the panel member and extending away from the second layer of the panel member.

* * * * *